United States Patent
Okamoto

[19]

[11] Patent Number: 6,122,113
[45] Date of Patent: Sep. 19, 2000

[54] DEVICE FOR DETERMINING FOCAL POSITION OF ZOOM LENS

[75] Inventor: Hajime Okamoto, Kanagawa-Ken, Japan

[73] Assignee: Toptronic Industrial Co., Ltd., Taipei, Taiwan

[21] Appl. No.: 09/395,356

[22] Filed: Sep. 14, 1999

[30] Foreign Application Priority Data

Aug. 13, 1999 [TW] Taiwan .................................. 88114008

[51] Int. Cl.$^7$ ...................................................... G02B 15/14

[52] U.S. Cl. ........................... 359/699; 359/703; 359/823; 359/827

[58] Field of Search .................................... 359/694, 699, 359/700, 703, 704, 823, 827

[56] References Cited

U.S. PATENT DOCUMENTS

| | | | |
|---|---|---|---|
| 5,581,411 | 12/1996 | Nomura et al. | 359/694 |
| 5,721,645 | 2/1998 | Iwasaki et al. | 359/823 |
| 5,966,249 | 10/1999 | Aoki | 359/699 |

*Primary Examiner*—Huy Mai
*Attorney, Agent, or Firm*—Browdy and Neimark

[57] ABSTRACT

A zoom lens is formed of a fixed cylinder, an outer movable cylinder, an inner movable cylinder, and a guide plate disposed between the fixed cylinder and the outer movable cylinder. The outer movable cylinder is movably fitted into the fixed cylinder and is provided at one end thereof with a first locating point, a second locating point, and a third locating point. The guide plate displaces along with the outer movable cylinder and has a reference portion, which is aligned with the first locating point, the second locating point, and the third locating point to determine the focal position of the lens.

3 Claims, 5 Drawing Sheets

DEVICE FOR DETERMINING FOCAL POSITION OF ZOOM LENS

FIELD OF THE INVENTION

The present invention relates generally to a video camera, and more particularly to a device for measuring the focal position of a zoom lens of the video camera.

BACKGROUND OF THE INVENTION

The video camera is provided with a zoom lens located at the position of the coated surface of the film. The zoom lens is formed of a fixed cylinder, an outer movable cylinder, and an inner movable cylinder, which house a first group of lenses and a second group of lenses. The focus positions of these lenses change along with the telescopic displacements of the movable cylinders. When the camera is in use, these lenses are mounted on a wide-angle position or a telephoto position.

The zoom lens must be mounted in the body of the video camera in such a manner that the focal position of the lens must be consistent with the coated surface of the film. This calls for series of operations with regard to the optical position, so as to make sure that the focal position of the lens is located on the coated surface of the film loaded in the body of the camera. In order to detect the precise optical position, it is necessary to measure mechanically the data of a retraction position of the lens under the circumstance that the main switch of the camera is turned off. When the lens is located at the wide-angle position, the data of a wide-angle position of the lens are mechanically measured. Finally, the data of a telephoto position of the lens are mechanically measured at the time when the lens of the camera is set at the telephoto position. The data are then keyed into an EEPROM on the camera body loop so as to enable the lens to stop at a specified position.

Such a method of data measurement as described above is deficient in design in that the reference data measured by means of instrument can not be efficiently employed in practice, and that the measured data are often erroneous in view of the inaccurate reference position of locating the lens at the time of measurement. In addition, an additional space must be reserved at each position of the lens, thereby resulting in an excessive increase in volume of the camera.

SUMMARY OF THE INVENTION

The primary objective of the present invention is to provide a device for measuring rapidly and precisely the focusing position of a zoom lens.

In keeping with the principle of the present invention, the foregoing objective of the present invention is attained by a measuring device comprising a fixed cylinder in which an outer movable cylinder and an inner movable cylinder are disposed in such a manner that the movable cylinders are capable of a simultaneous displacement along the direction of the longitudinal axis of the fixed cylinder. As a result, a first group of lenses and a second group of lenses, which are disposed in the movable cylinders, are thus caused to undertake a change in the focal position. The zoom lens is characterized by the outer movable cylinder which is capable of displacing in the fixed cylinder and is provided with a first locating point, a second locating point, and a third locating point. Located between the fixed cylinder and the outer movable cylinder is a guide plate which is provided with a reference portion capable of being aligned with each of the locating points. When the reference portion is in alignment with the first locating point, the inner and the outer movable cylinders are completely retracted into the fixed cylinder. When the reference portion is in alignment with the second locating point, the inner and the outer movable cylinders are slightly extracted such that the camera lens is located at the wide-angle position. When the reference portion is in alignment with the third locating position, the inner and the outer movable cylinders are completely extracted such that the camera lens is located at the telephoto position.

The objective, features, functions, and advantages of the present invention will be more readily understood upon a thoughtful deliberation of the following detailed description of a preferred embodiment of the present invention with reference to the accompanying drawings.

DETAILED DESCRIPTION OF THE INVENTION

Figure 1:
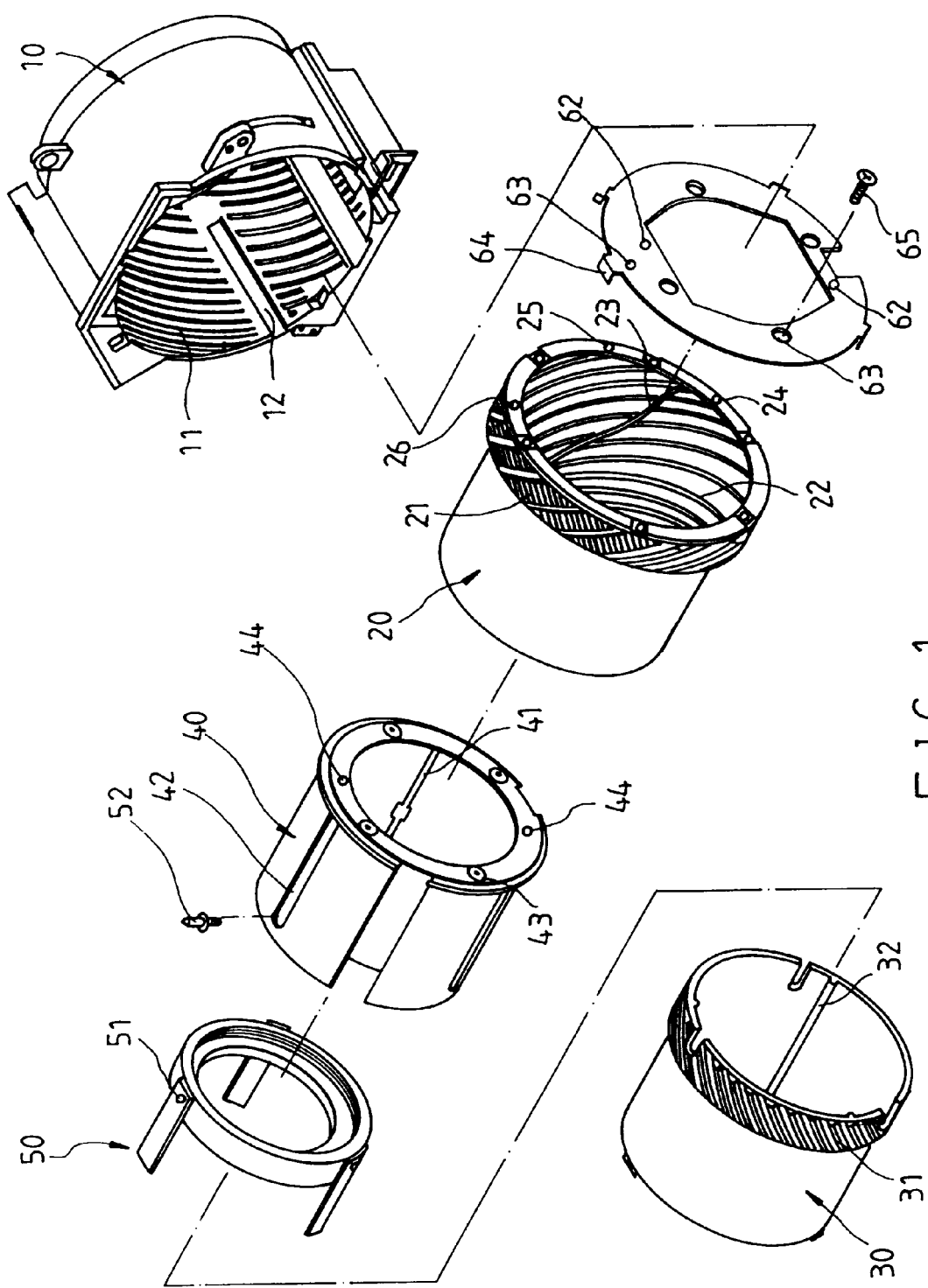
FIG. 1 shows an exploded view of a zoom lens of a preferred embodiment of the present invention.
Figure 2:
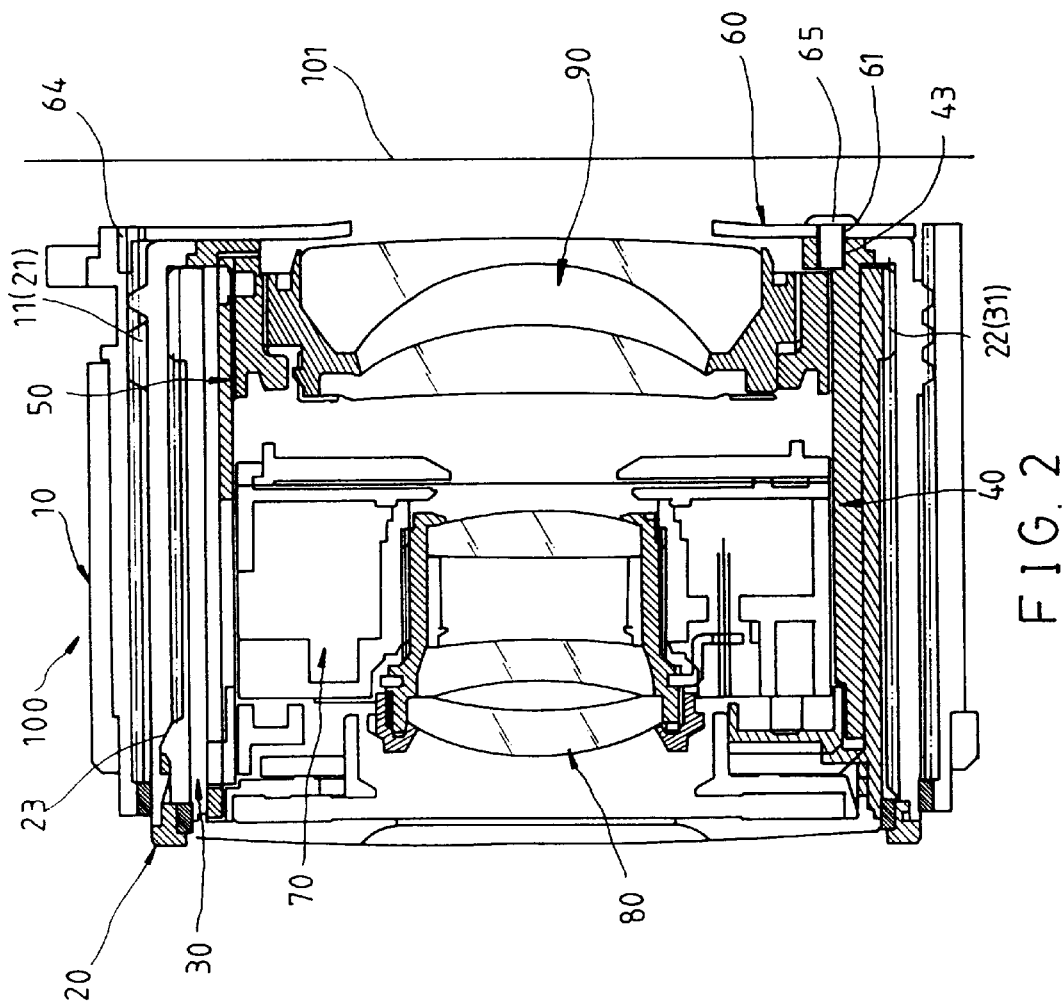
FIG. 2 shows a sectional view of the zoom lens of the preferred embodiment of the present invention in combination.

As shown in FIGS. 1 and 2, a device of the preferred embodiment of the present invention is used to determine the focal position of a zoom lens 100, which is mounted at the position where the coated surface 101 of a film loaded in a camera (not shown in the drawing) is located. The zoom lens 100 is formed of a fixed cylinder 10, an outer movable cylinder 20, an inner movable cylinder 30, a plunge cylinder 40, a slide cylinder 50, and a guide plate 60.

The fixed cylinder 10 is fixed at the position relative to the coated surface 101 of a film which is loaded in the camera and is provided in the inner wall thereof with a threaded surface 11, and three plunge slots 12 which are equally divided along the coaxial direction.

The outer movable cylinder 20 is fitted into the fixed cylinder 10 and is provided in the outer peripheral surface thereof with a slanted outer threaded section 21, which is engaged with the threaded surface 11. The outer movable cylinder 20 is capable of rotating and displacing along the direction of the axis of the fixed cylinder 10. The outer movable cylinder 20 is further provided in the inner wall thereof with an inner threaded surface 22, which is equally divided into three guide slots 23. The outer movable cylinder 20 has one end which faces the coated surface 101 and is provided with a first locating point 24, a second locating point 25, and a third locating point 26, which are designed through computation.

The inner movable cylinder 30 is fitted into the outer movable cylinder 20 and is provided in the outer peripheral surface thereof with an outer threaded section 31, which is engaged with the inner threaded surface 22 to enable the inner movable cylinder 30 to displace along the direction of the axis of the outer movable cylinder 20. The inner movable cylinder 30 is provided in the front section thereof with a shutter 70 and a first lens group 80, and in the inner wall thereof with three guide ribs 32 parallel to the axis of the inner movable cylinder 30.

The plunge cylinder 40 is provided in the outer peripheral surface thereof with three guide grooves 41 which are parallel to the axis of the plunge cylinder 40 and retain the guide ribs 32 for confining the movement of the plunge cylinder 40 inside the inner movable cylinder 30. The plunge cylinder 40 is provided in the periphery thereof with three cut slots 42. The plunge cylinder 40 has one end which faces the coated surface 101 and is provided with a plurality of threaded holes 43 and two locating projections 44.

The slide cylinder 50 is fitted into the plunge cylinder 40 and is provided in the periphery thereof with three locating holes 51, and three guide pins 52 which are received in the three guide slots 23 of the outer movable cylinder 20. The slide cylinder 50 moves back and forth along with the outer movable cylinder 20 in motion. The slide cylinder 50 is further provided with a second lens group 90.

The guide plate 60 is disposed between the fixed cylinder 10 and the outer movable cylinder 20. The guide plate 60 is provided with a plurality of through holes 61, two locating holes 62, a reference round hole 63, and three protruded guide pieces 64. The guide plate 60 is secured to the plunge cylinder 40 such that the two locating projections 44 of the plunge cylinder 40 are retained in the two locating holes 62 of the guide plate 60. The guide plate 60 is further secured to the plunge cylinder 40 by a plurality of bolts 65 which are engaged with the threaded holes 43 via the through holes 61. In the meantime, the guide pieces 64 are received in the plunge slots 12 of the fixed cylinder 10. As a result, the guide plate 60 moves in a straight direction without rotating. The reference round hole 63 of the guide plate 60 can be aligned with each of the locating points 24, 25 and 26.

The zoom lens 100 of the present invention is driven by a drive device (not shown in the drawings) of a camera to extract or retract such that the inner cylinder 30 translates without rotating, thereby resulting in a change in position of the first lens group 80. In the meantime, the outer movable cylinder 20 is engaged in the turning motion. In view of the guide plate 60 being confined by the plunge slots 12, the guide plate 60 displaces back and forth along with the outer movable cylinder 20 in motion. The guide plate 60 is connected with the plunge cylinder 40, which is thus always located inside the outer movable cylinder 20. The guide pins 52 of the slide cylinder 50 are received in the guide slots 23 to enable the slide cylinder 50 to displace back and forth along with the outer movable cylinder 20 in motion, thereby resulting in a change of position of the second lens group 90. In light of the changes in positions of the first lens group 80 and the second lens group 90 of the zoom lens 100 of the present invention, the camera lens is capable of bringing about a number of focal variations.

Figure 3:
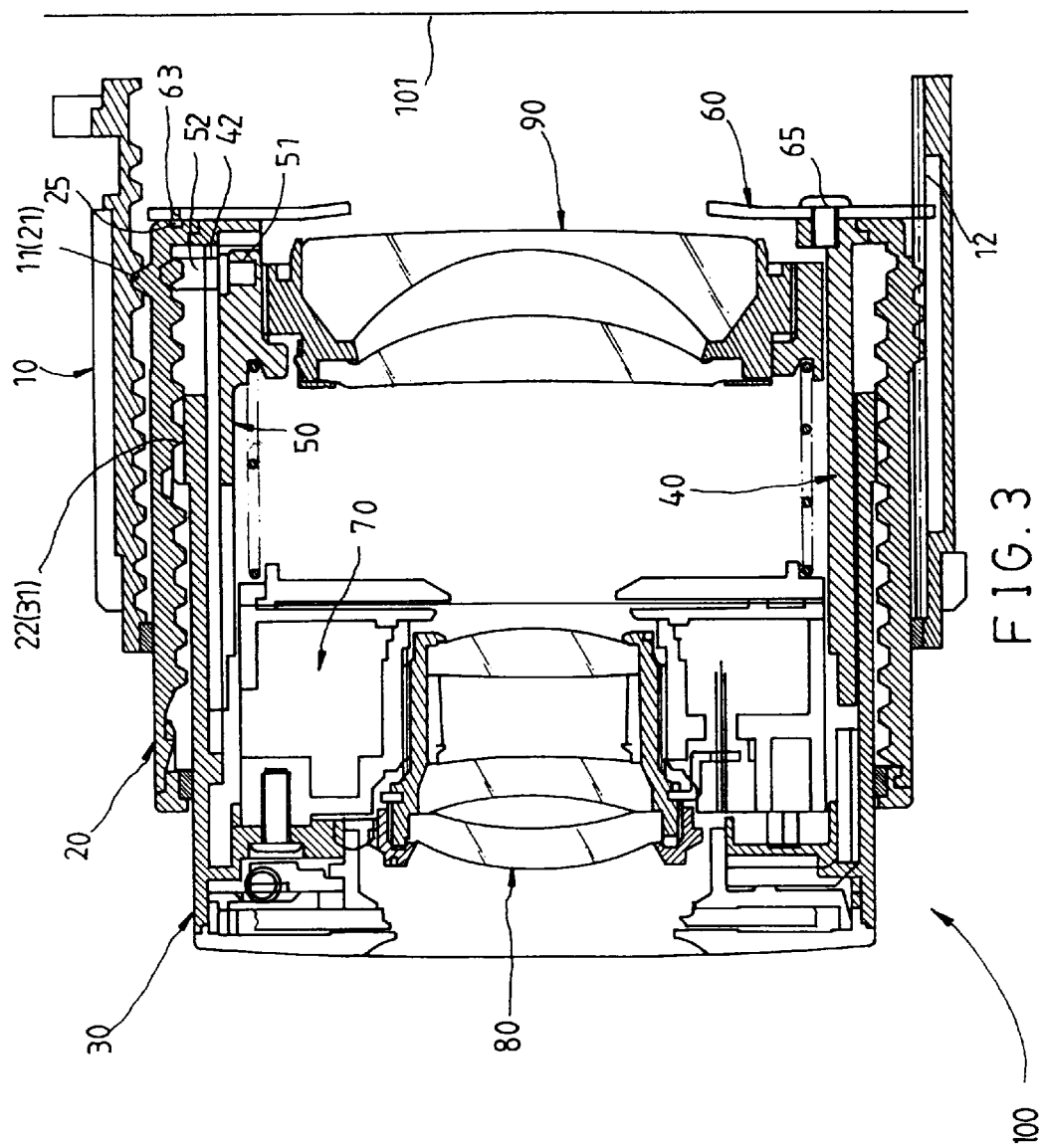
FIG. 3 shows a schematic view of the zoom lens of the preferred embodiment of the present invention located at the wide-angle position.
Figure 4:
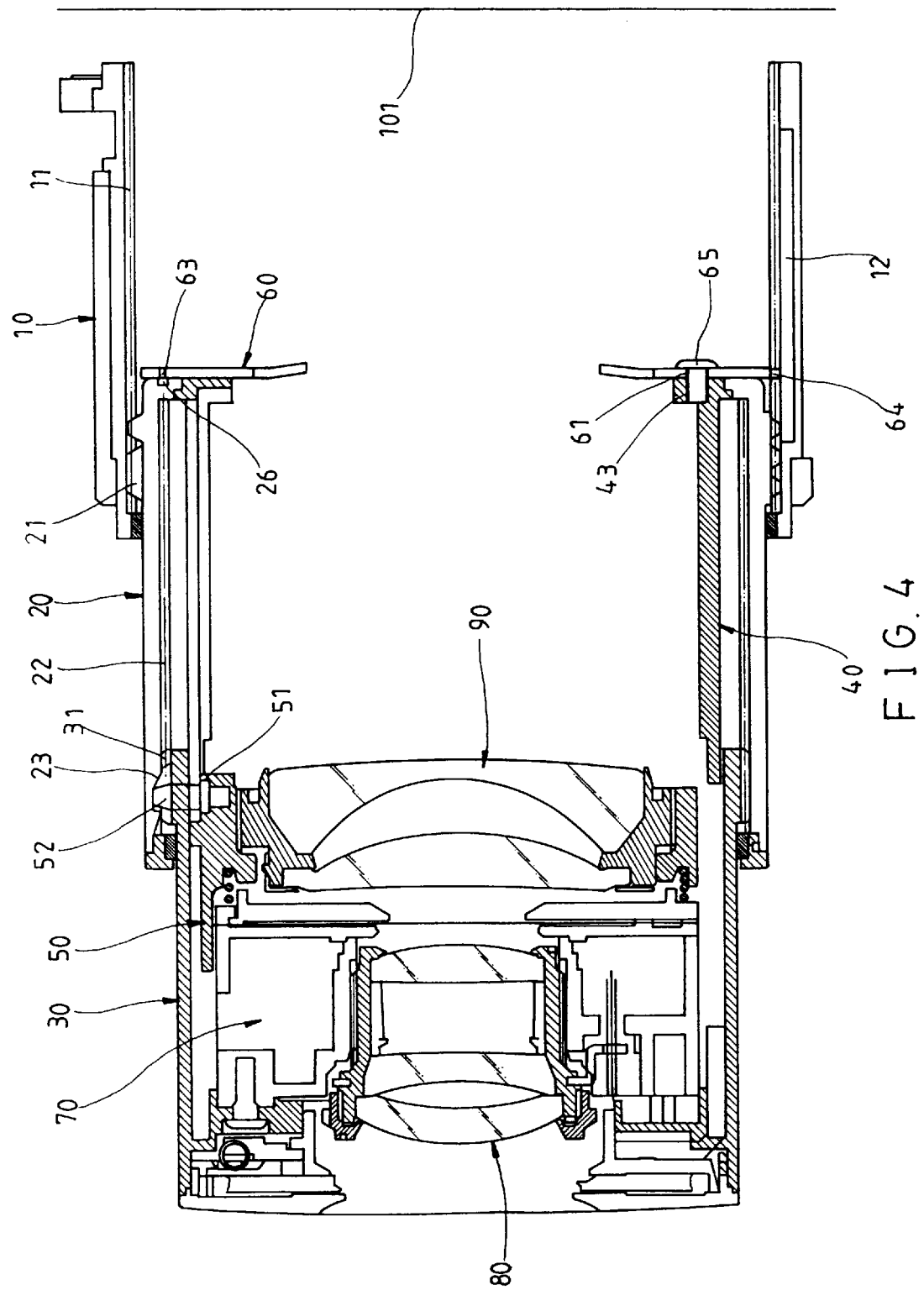
FIG. 4 shows a schematic view of the zoom lens of the preferred embodiment of the present invention located at the telephoto position.
Figure 5:
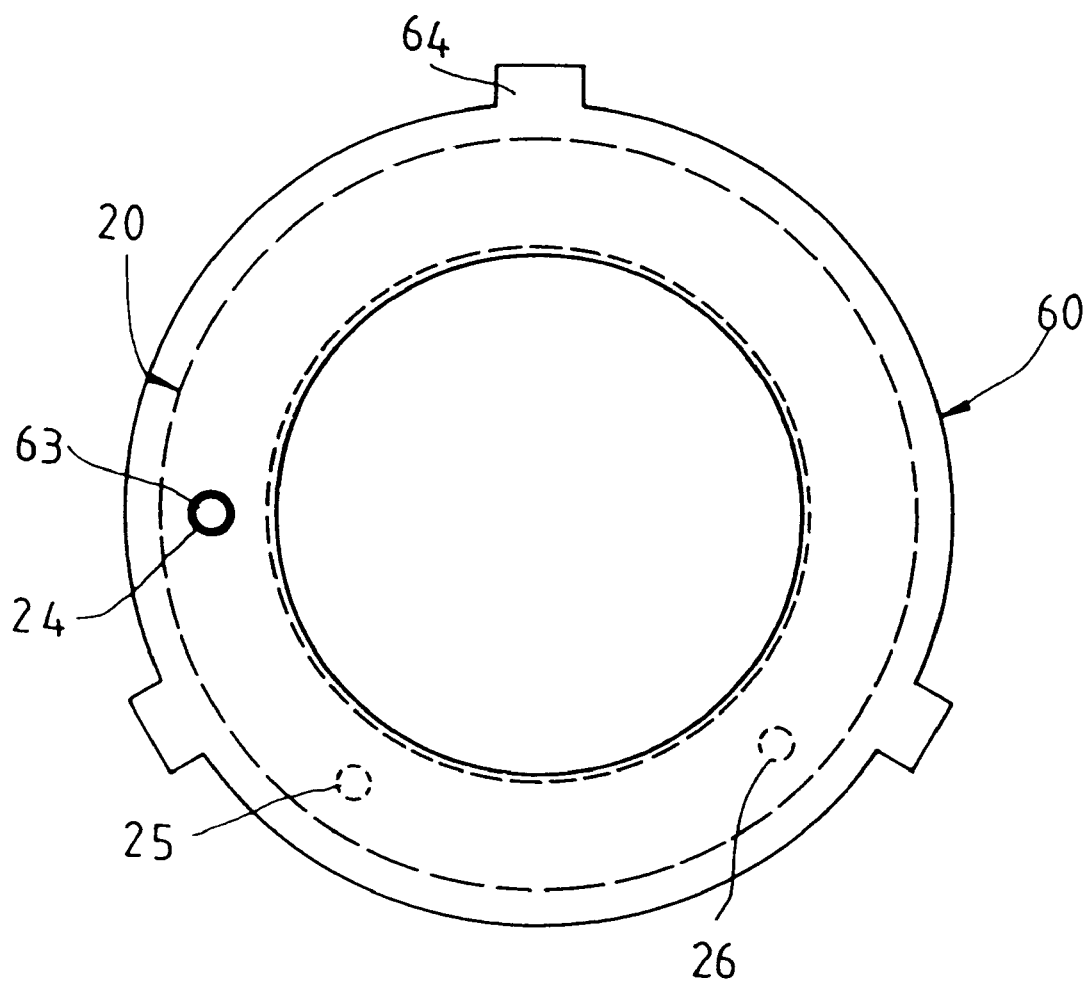
FIG. 5 shows a schematic view of the position relationship of indicators used in measuring the focal positions of the zoom lens of the preferred embodiment of the present invention.

As the structures of the present invention are mounted on the camera, it is necessary to measure the zooming positions (the complete retraction position, the wide-angle position, and the telephoto position) of the lens. The measurement is taken with the naked eye at the position, where the coated surface 101 of the film is located, to make sure if the reference round hole 63 of the guide plate 60 is in alignment with each of the locating points 24, 25 and 26, as shown in FIG. 5. In other words, when the inner movable cylinder 30 and the outer movable cylinder 20 are completely retracted into the fixed cylinder 10, the main switch of the camera is turned off such that the reference round hole 63 and the first locating point 24 are overlapped, as shown in FIG. 2. When the main switch is turned on, the inner and the outer movable cylinders 30 and 20 are partially extracted such that the camera lens is located at the wide-angle position, and that the outer movable cylinder 20 turns forward, and further that the guide plate 60 does not turn. As a result, when the reference round hole 63 and the second locating point 25 are overlapped, the camera lens is located at the wide-angle position for sure, as shown in FIG. 3. When the inner and the outer movable cylinders 30 and 20 are completed extracted such that the camera lens is located at the telephoto position, and that the outer movable cylinder 20 turns forward to enable the third locating point 26 to align with the reference round hole 63. The camera lens is thus located at the telephoto position for sure, as shown in FIG. 4.

The focal position of the camera lens can be measured with speed and precision by turning the outer movable cylinder 20 to bring about a change in position of each locating point in conjunction with the observation with the naked eye the position of the reference round hole 63 of the guide plate 60.

The present invention has advantages, which are described hereinafter.

The outer movable cylinder 20 is provided at one end thereof with the locating points whose positions are predetermined by calculation. The guide plate 60 is provided with a reference point 63 which is aligned with the locating points. The alignment is seen with the naked eye at the position where the coated surface 101 of the film is located, thereby determining with certainty the focal positions of the camera lens.

In light of the precise focal location of the camera lens of the present invention, the component parts of the present invention are set up without reservation of the buffer space. As a result, the camera can be substantially miniaturized.

The embodiment of the present invention described above is to be regarded in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A device for determining the focal position of a zoom lens, said device comprising a fixed cylinder, an outer movable cylinder fitted into said fixed cylinder, and an inner movable cylinder fitted into said fixed cylinder, said outer movable cylinder and said inner movable cylinder capable of being extracted and retracted along the direction of an axis of said fixed cylinder such that the focal positions of a first lens group and a second lens group are changed;

wherein said outer movable cylinder has one end which faces the interior of said fixed cylinder and is provided with a first locating point, a second locating point, and a third locating point;

wherein said fixed cylinder and said outer movable cylinder are provided therebetween with a guide plate which displaces along with said outer movable cylinder without turning and is provided with a reference portion whereby said reference portion is aligned with said first locating point to indicate a complete retraction of said inner movable cylinder and said outer movable cylinder into said fixed cylinder, said reference portion being aligned with said second locating point to indicate a partial extraction of said inner movable cylinder and said outer movable cylinder from said fixed cylinder, said reference portion being aligned with said third locating point to indicate a complete extraction of said inner movable cylinder and said outer movable cylinder from said fixed cylinder.

2. The device as defined in claim 1, wherein said fixed cylinder is provided in an inner wall thereof with a plurality of plunge slots coaxial with one another; wherein said guide plate is provided with a plurality of guide pieces in cooperation with said plunge slots; and wherein said inner movable cylinder is provided with a plunge cylinder fitted thereinto, and a slide cylinder fitted into said plunge cylinder whereby said plunge cylinder is connected with said guide plate.

3. The device as defined in claim 1, wherein said reference portion of said guide plate is a reference round hole.

* * * * *